(12) United States Patent
Shinozaki et al.

(10) Patent No.: US 12,473,422 B2
(45) Date of Patent: Nov. 18, 2025

(54) RUBBER COMPOSITION, TIRE, AND ADDITIVE FOR RUBBER

(71) Applicant: OSTUKA CHEMICAL CO., LTD., Osaka (JP)

(72) Inventors: Shinya Shinozaki, Tokushima (JP); Mifuyu Ueno, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 531 days.

(21) Appl. No.: 17/802,491

(22) PCT Filed: Feb. 26, 2021

(86) PCT No.: PCT/JP2021/007246
§ 371 (c)(1),
(2) Date: Aug. 25, 2022

(87) PCT Pub. No.: WO2021/172487
PCT Pub. Date: Sep. 2, 2021

(65) Prior Publication Data
US 2023/0105406 A1    Apr. 6, 2023

(30) Foreign Application Priority Data

Feb. 28, 2020   (JP) ................... 2020-033362

(51) Int. Cl.
*C08K 5/25*     (2006.01)
*B60C 1/00*     (2006.01)
(Continued)

(52) U.S. Cl.
CPC ................. *C08K 5/25* (2013.01); *B60C 1/00* (2013.01); *C08K 5/3445* (2013.01);
(Continued)

(58) Field of Classification Search
CPC .......... B60C 1/00; C08K 5/25; C08K 5/3445; C08K 5/3462; C08K 5/3472; C08L 7/00
See application file for complete search history.

(56) References Cited

U.S. PATENT DOCUMENTS

2009/0176916 A1    7/2009   Nakano
2012/0184671 A1*   7/2012   Sakaki ................. C08L 7/00
                                                  525/333.1
(Continued)

FOREIGN PATENT DOCUMENTS

CN         101451006 A     6/2009
DE    112015002889 T5 *   2/2017  ............. B29B 13/02
(Continued)

OTHER PUBLICATIONS

Oprea, Effect of Pyridazine Content and Crosslinker Structure on the Properties of Polyurethane Elastomers, 2013, Journal of Applied Polymer Science, vol. 128, Issue 6, p. 3974-3981 (Year: 2013).*

(Continued)

*Primary Examiner* — Mark Eashoo
*Assistant Examiner* — Caitlin Norine Illing
(74) *Attorney, Agent, or Firm* — Kratz, Quintos & Hanson, LLP

(57) ABSTRACT

A rubber composition comprising at least one member selected from the group consisting of compounds represented by the following formulas (1) to (7) and 3-methyl-5-pyrazolone, and a rubber component:

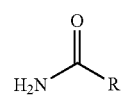

(1)

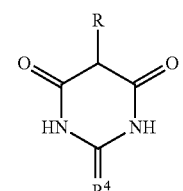

(2)

(3)

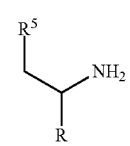

(4)

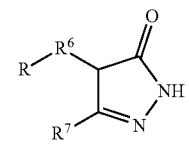

(5)

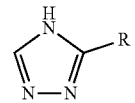

(6)

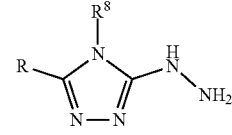

(7)

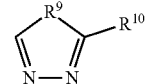

wherein the R group is a hydrazide group, an N'-alkylidene hydrazide group, an N-allyl carbamoyl group, a 3-carboxyl acryloyl group, a hydrazine carboxyamino group, a thiocarboxyl group, a thiol group, or a hydrogen atom; $R^4$ is a sulfur atom or an oxygen atom; $R^5$ is a thiol group or a hydroxy group; $R^6$ is a $C_{1-4}$ alkylene group; $R^7$ is an alkyl group, an (Continued)

aralkyl group, an aryl group, or a heterocyclic group; $R^8$ is a hydrogen atom or an amino group; $R^9$ is a heteroatom; and $R^{10}$ is a heterocyclic group.

2 Claims, No Drawings

(51) Int. Cl.
*C08K 5/3445* (2006.01)
*C08K 5/3462* (2006.01)
*C08K 5/3472* (2006.01)
*C08L 7/00* (2006.01)

(52) U.S. Cl.
CPC .......... *C08K 5/3462* (2013.01); *C08K 5/3472* (2013.01); *C08L 7/00* (2013.01)

(56) References Cited

U.S. PATENT DOCUMENTS

| | | | |
|---|---|---|---|
| 2020/0283611 A1* | 9/2020 | Bish | .......... C08K 3/04 |
| 2021/0087367 A1 | 3/2021 | Chino et al. | |

FOREIGN PATENT DOCUMENTS

| | | | | |
|---|---|---|---|---|
| EP | 2819854 | A1 | 1/2015 | |
| EP | 3845591 | A1 | 7/2021 | |
| FR | 2935979 | A1 * | 3/2010 | ............. C08C 19/22 |
| FR | 3044315 | A1 * | 6/2017 | ............. B60C 1/00 |
| JP | S53-036539 | A | 4/1978 | |
| JP | 859-110679 | A | 6/1984 | |
| JP | 108-027315 | A | 1/1996 | |
| JP | 2000-239442 | A | 9/2000 | |
| JP | 2008-189911 | A | 8/2008 | |
| JP | 2010-242013 | A | 10/2010 | |
| JP | 2014-509690 | A | 4/2014 | |
| JP | 2014-237788 | A | 12/2014 | |
| JP | 2016041779 | A * | 3/2016 | |
| JP | 2017039824 | A * | 2/2017 | |
| JP | 2018-150439 | A | 9/2018 | |
| WO | 2012/135782 | A1 | 10/2012 | |
| WO | WO-2013130099 | A1 * | 9/2013 | ............. B60C 1/00 |
| WO | WO-2018025966 | A1 * | 2/2018 | ............. B60C 1/00 |
| WO | 2019/027022 | A1 | 2/2019 | |
| WO | 2019/235526 | A1 | 12/2019 | |

OTHER PUBLICATIONS

DE112015002889T5 machine translation (Year: 2017).*
FR2935979A1 machine translation (Year: 2010).*
FR3044315A1 machine translation (Year: 2017).*
JP2016041779A machine translation (Year: 2016).*
JP2017039824A machine translation (Year: 2017).*
WO2018025966A1 machine translation (Year: 2018).*
Supplementary European Search Report for European Patent Application No. 21760301.8 dated Feb. 16, 2024 (7 sheets).
Database WPI; Week 200943; Thomson Scientific London, GB; AN 2009-K55656; XP002810890; Jun. 10, 2009 (2 sheets).
International Search Report for International Application No. PCT/JP2021/007246 dated May 11, 2021 (4 sheets, 3 sheets translation, 7 sheets total).

* cited by examiner

RUBBER COMPOSITION, TIRE, AND ADDITIVE FOR RUBBER

TECHNICAL FIELD

The present invention relates to a rubber composition, a tire, and an additive for rubber.

BACKGROUND ART

As the demand for the performance of tires increases, studies have been made on the use of various additives for rubber in rubber materials for constituting tires.

One of the performances required for tires is high mechanical strength, more specifically high tear strength. Additives for rubber for that purpose are required.

In order to solve these problems, for example, rubber compositions comprising a rubber component, carbon black, and a triazole compound (PTL 1 and PTL 2) have been proposed; however, it cannot be said that these compositions have sufficient mechanical strength.

CITATION LIST

Patent Literature

PTL 1: JP2010-242013A
PTL 2: WO2019/027022

SUMMARY OF INVENTION

Technical Problem

In view of the above circumstances, an object of the present invention is to provide a rubber composition or an additive for rubber for producing a tire having high tear strength.

Solution to Problem

As a result of extensive research to achieve the above object, the present inventors found that a rubber composition having high tear strength can be provided by using a compound having a specific structure as an additive for rubber. The inventors further conducted research based on the above finding. The present invention has thus been completed.

That is, the present invention provides the following rubber composition, tire, and additive for rubber.

Item 1

A rubber composition comprising at least one compound selected from the group consisting of compounds represented by the following formulas (1) to (7) and 3-methyl-5-pyrazolone, and a rubber component:

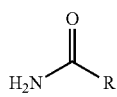

(1)

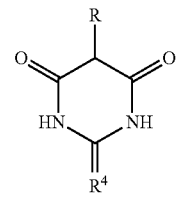

(2)

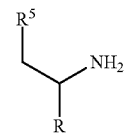

(3)

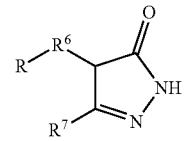

(4)

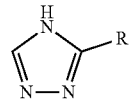

(5)

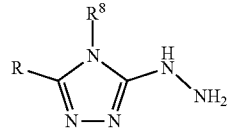

(6)

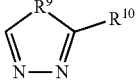

(7)

wherein the R group is a hydrazide group, an N'-alkylidene hydrazide group, an N-allyl carbamoyl group, a 3-carboxyl acryloyl group, a hydrazine carboxyamino group, a thiocarboxyl group, a thiol group, or a hydrogen atom; $R^4$ is a sulfur atom or an oxygen atom; $R^5$ is a thiol group or a hydroxy group; $R^6$ is a $C_{1-4}$ alkylene group; $R^7$ is an alkyl group, an aralkyl group, an aryl group, or a heterocyclic group; $R^8$ is a hydrogen atom or an amino group; $R^9$ is a heteroatom; and $R^{10}$ is a heterocyclic group.

Item 2

The rubber composition according to Item 1, wherein the R group in formula (1) or (5) is $R^1$, wherein $R^1$ is a hydrazide group, an N'-alkylidene hydrazide group, a thiocarboxyl group, an N-allyl carbamoyl group, a 3-carboxyl acryloyl group, or a hydrazine carboxyamino group.

Item 3

The rubber composition according to Item 1 or 2, wherein R in formula (3), (4), or (6) is $R^2$, wherein $R^2$ is a hydrazide group, an N'-alkylidene hydrazide group, a thiol group, an N-allyl carbamoyl group, a 3-carboxyl acryloyl group, or a hydrazine carboxyamino group.

Item 4

The rubber composition according to any one of Items 1 to 3, wherein R in formula (2) is $R^3$, wherein $R^3$ is a hydrogen atom, a hydrazide group, an N'-alkylidene hydrazide group, a thiol group, an N-allyl carbamoyl group, a 3-carboxyl acryloyl group, or a hydrazine carboxyamino group.

Item 5

The rubber composition according to any one of Items 1 to 4, wherein $R^9$ in formula (7) is an oxygen atom, a sulfur atom, or $NR^{11}$, and $R^{11}$ is a hydrogen atom or an amino group.

Item 6

The rubber composition according to any one of Items 1 to 5, wherein $R^{10}$ in formula (7) is a nitrogen-containing heterocyclic group.

Item 7

The rubber composition according to Item 6, wherein the nitrogen-containing heterocyclic group is a six-membered ring group.

Item 8

The rubber composition according to Item 6 or 7, wherein the nitrogen-containing heterocyclic group is a substituted or unsubstituted pyridyl group, and the pyridyl group is a 2-pyridyl group, a 3-pyridyl group, or a 4-pyridyl group.

Item 9

A tire using the rubber composition according to any one of Items 1 to 8.

Item 10

An additive for rubber comprising at least one compound selected from the group consisting of compounds represented by the following formulas (1) to (7) and 3-methyl-5-pyrazolone:

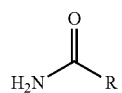

(1)

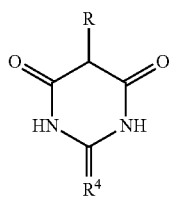

(2)

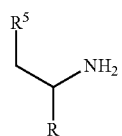

(3)

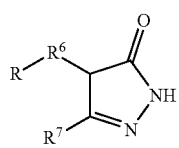

(4)

-continued

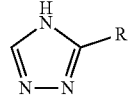

(5)

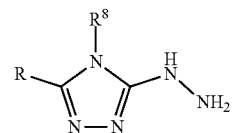

(6)

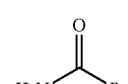

(7)

wherein the R group is a hydrazide group, an N'-alkylidene hydrazide group, an N-allyl carbamoyl group, a 3-carboxyl acryloyl group, a hydrazine carboxyamino group, a thiocarboxyl group, a thiol group, or a hydrogen atom; $R^4$ is a sulfur atom or an oxygen atom; $R^5$ is a thiol group or a hydroxy group; $R^6$ is a $C_{1-4}$ alkylene group; $R^7$ is an alkyl group, an aralkyl group, an aryl group, or a heterocyclic group; $R^8$ is a hydrogen atom or an amino group; $R^9$ is a heteroatom; and $R^{10}$ is a heterocyclic group.

Item 11

The additive for rubber according to Item 10, which is a tear strength-imparting agent.

Advantageous Effects of Invention

The rubber composition or additive for rubber of the present invention can provide a tire having high tear strength.

DESCRIPTION OF EMBODIMENTS

1. Rubber Composition

The rubber composition of the present invention comprises at least one member selected from the group consisting of compounds represented by formulas (1), (2), (3), (4), (5), (6), and (7) and 3-methyl-5-pyrazolone, described later, and a rubber component, also described later. Further, the rubber composition of the present invention contains other components, if necessary. Rubber materials obtained by using the rubber composition have high tear strength and can be suitably used, for example, for tires.

1.1. Compounds Represented by Formulas (1) to (7) and 3-Methyl-5-Pyrazolone

The compounds represented by formulas (1) to (7) contained in the rubber composition are as shown below.

(1)

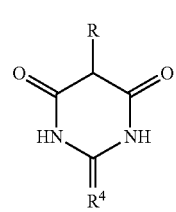

(2)

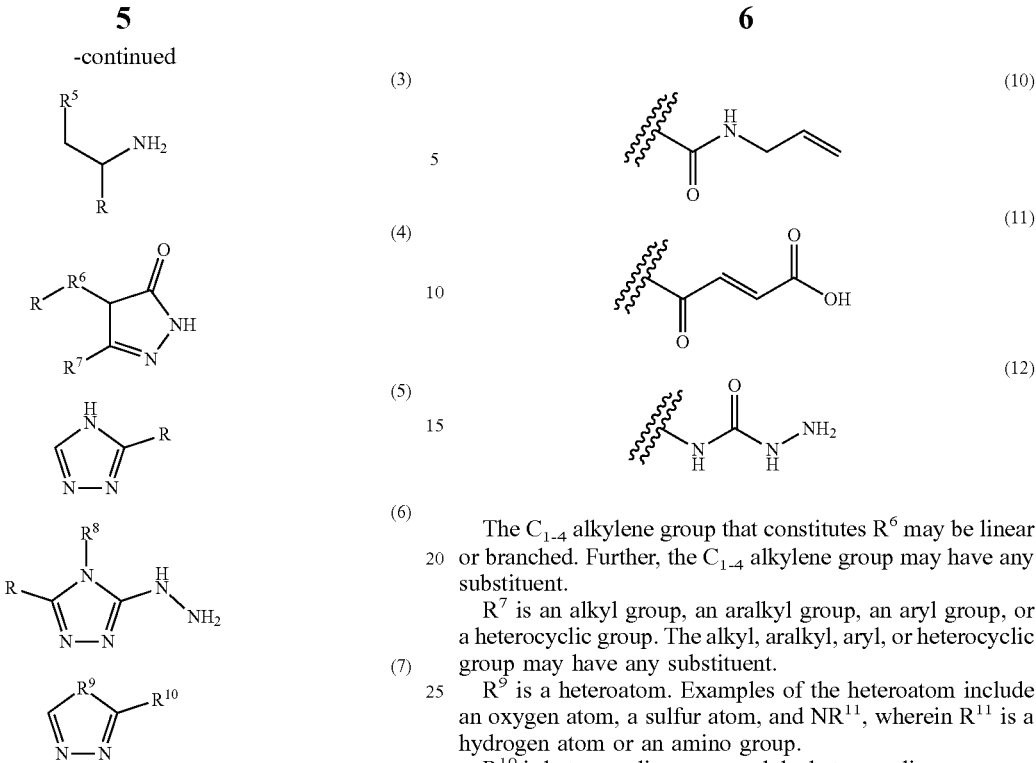

wherein the R group is a hydrazide group, an N'-alkylidene hydrazide group, an N-allyl carbamoyl group, a 3-carboxyl acryloyl group, a hydrazine carboxyamino group, a thiocarboxyl group, a thiol group, or a hydrogen atom; $R^4$ is a sulfur atom or an oxygen atom; $R^5$ is a thiol group or a hydroxy group; $R^6$ is a $C_{1-4}$ alkylene group; $R^7$ is an alkyl group, an aralkyl group, an aryl group, or a heterocyclic group; $R^8$ is a hydrogen atom or an amino group; $R^9$ is a heteroatom; and $R^{10}$ is a heterocyclic group.

The hydrazide group is a group represented by the following formula (8):

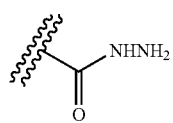 (8)

The N'-alkylidene hydrazide group is a group represented by the following formula (9). $R^{12}$ and $R^{13}$ are each independently a hydrogen atom, an alkyl group, an aralkyl group, an aryl group, or a heterocyclic group. Of these, the alkyl, aralkyl, aryl, or heterocyclic group may have any substituent.

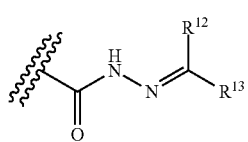 (9)

The N-allyl carbamoyl group, 3-carboxyl acryloyl group, and hydrazine carboxyamino group indicate groups represented by the following formulas (10), (11), and (12), respectively.

The $C_{1-4}$ alkylene group that constitutes $R^6$ may be linear or branched. Further, the $C_{1-4}$ alkylene group may have any substituent.

$R^7$ is an alkyl group, an aralkyl group, an aryl group, or a heterocyclic group. The alkyl, aralkyl, aryl, or heterocyclic group may have any substituent.

$R^9$ is a heteroatom. Examples of the heteroatom include an oxygen atom, a sulfur atom, and $NR^{11}$, wherein $R^{11}$ is a hydrogen atom or an amino group.

$R^{10}$ is heterocyclic group, and the heterocyclic group may further have any substituent.

In the present specification, the "alkyl group" is not particularly limited, and examples include linear, branched, or cyclic alkyl groups. Specific examples include $C_{1-6}$ linear or branched alkyl groups, such as methyl, ethyl, n-propyl, isopropyl, n-butyl, isobutyl, s-butyl, t-butyl, 1-ethylpropyl, n-pentyl, neopentyl, n-hexyl, isohexyl, and 3-methylpentyl groups; $C_{3-8}$ cyclic alkyl groups, such as cyclopropyl, cyclobutyl, cyclopentyl, cyclohexyl, cycloheptyl, and cyclooctyl; and the like. The alkyl group is preferably a $C_{1-6}$ linear or branched alkyl group; more preferably a methyl, ethyl, n-propyl, isopropyl, n-butyl, isobutyl, or n-pentyl group; and particularly preferably a methyl or ethyl group.

In the present specification, the "aralkyl group" is not particularly limited, and examples include benzyl, phenethyl, trityl, 1-naphthylmethyl, 2-(1-naphthyl)ethyl, and 2-(2-naphthyl)ethyl groups. The aralkyl group is more preferably a benzyl or phenethyl group, and even more preferably a benzyl group.

In the present specification, the "aryl group" is not particularly limited, and examples include phenyl, biphenyl, naphthyl, dihydroindenyl, and 9H-fluorenyl groups. The aryl group is more preferably a phenyl or naphthyl group, and particularly preferably a phenyl group.

In the present specification, the "heterocyclic group" is not particularly limited, and examples include 2-pyridyl, 3-pyridyl, 4-pyridyl, 2-pyrazinyl, 2-pyrimidyl, 4-pyrimidyl, 5-pyrimidyl, 3-pyridazyl, 4-pyridazyl, 4-(1,2,3-triazyl), 5-(1,2,3-triazyl), 2-(1,3,5-triazyl), 3-(1,2,4-triazyl), 5-(1,2,4-triazyl), 6-(1,2,4-triazyl), 2-quinolyl, 3-quinolyl, 4-quinolyl, 5-quinolyl, 6-quinolyl, 7-quinolyl, 8-quinolyl, 1-isoquinolyl, 3-isoquinolyl, 4-isoquinolyl, 5-isoquinolyl, 6-isoquinolyl, 7-isoquinolyl, 8-isoquinolyl, 2-quinoxalyl, 3-quinoxalyl, 5-quinoxalyl, 6-quinoxalyl, 7-quinoxalyl, 8-quinoxalyl, 3-cinnolyl, 4-cinnolyl, 5-cinnolyl, 6-cinnolyl, 7-cinnolyl, 8-cinnolyl, 2-quinazolyl, 4-quinazolyl, 5-quinazolyl, 6-quinazolyl, 7-quinazolyl, 8-quinazolyl, 1-phthalazyl, 4-phthalazyl, 5-phthalazyl, 6-phthalazyl, 7-phthalazyl, 8-phthalazyl, 1-tetrahydroquinolyl, 2-tetrahydroquinolyl, 3-tetrahydroquinolyl, 4-tetrahydroquinolyl, 5-tetrahydroquinolyl, 6-tetrahydroquinolyl, 7-tetrahydroquinolyl, 8-tetrahydroquinolyl, 1-pyrrolyl, 2-pyrrolyl, 3-pyrrolyl, 2-furyl, 3-furyl, 2-thienyl, 3-thienyl, 1-imidazolyl, 2-imidazolyl, 4-imidazolyl, 5-imidazolyl, 1-pyrazolyl, 3-pyrazolyl, 4-pyrazolyl, 5-pyrazolyl, 2-oxazolyl, 4-oxazolyl, 5-oxazolyl, 2-thiazolyl, 4-thiazolyl, 5-thiazolyl, 3-isoxazolyl, 4-isoxazolyl, 5-isoxazolyl, 3-isothiazolyl, 4-isothiazolyl, 5-isothiazolyl, 4-(1,2,3-thiadiazolyl), 5-(1,2,3-thiadiazolyl), 3-(1,2,5-thiadiazolyl), 2-(1,3,4-thiadiazolyl), 4-(1,2,3-oxadiazolyl), 5-(1,2,3-oxadiazolyl), 3-(1,2,4-oxadiazolyl), 5-(1,2,4-oxadiazolyl), 3-(1,2,5-oxadiazolyl), 2-(1,3,4-oxadiazolyl), 1-(1,2,3-triazolyl), 4-(1,2,3-triazolyl), 5-(1,2,3-triazolyl), 1-(1,2,4-triazolyl), 3-(1,2,4-triazolyl), 5-(1,2,4-triazolyl), 1-tetrazolyl, 5-tetrazolyl, 1-indolyl, 2-indolyl, 3-indolyl, 4-indolyl, 5-indolyl, 6-indolyl, 7-indolyl, 1-isoindolyl, 2-isoindolyl, 3-isoindolyl, 4-isoindolyl, 5-isoindolyl, 6-isoindolyl, 7-isoindolyl, 1-benzimidazolyl, 2-benzimidazolyl, 4-benzimidazolyl, 5-benzimidazolyl, 6-benzimidazolyl, 7-benzimidazolyl, 2-benzofuranyl, 3-benzofuranyl, 4-benzofuranyl, 5-benzofuranyl, 6-benzofuranyl, 7-benzofuranyl, 1-isobenzofuranyl, 3-isobenzofuranyl, 4-isobenzofuranyl, 5-isobenzofuranyl, 6-isobenzofuranyl, 7-isobenzofuranyl, 2-benzothienyl, 3-benzothienyl, 4-benzothienyl, 5-benzothienyl, 6-benzothienyl, 7-benzothienyl, 2-benzoxazolyl, 4-benzoxazolyl, 5-benzoxazolyl, 6-benzoxazolyl, 7-benzoxazolyl, 2-benzothiazolyl, 4-benzothiazolyl, 5-benzothiazolyl, 6-benzothiazolyl, 7-benzothiazolyl, 1-indazolyl, 3-indazolyl, 4-indazolyl, 5-indazolyl, 6-indazolyl, 7-indazolyl, 2-morpholyl, 3-morpholyl, 4-morpholyl, 1-piperazyl, 2-piperazyl, 1-piperidyl, 2-piperidyl, 3-piperidyl, 4-piperidyl, 2-tetrahydropyranyl, 3-tetrahydropyranyl, 4-tetrahydropyranyl, 2-tetrahydrothiopyranyl, 3-tetrahydrothiopyranyl, 4-tetrahydrothiopyranyl, 1-pyrrolidyl, 2-pyrrolidyl, 3-pyrrolidyl, 2-tetrahydrofuranyl, 3-tetrahydrofuranyl, 2-tetrahydrothienyl, 3-tetrahydrothienyl, and the like. Among these, the heterocyclic group is preferably pyridyl, furanyl, thienyl, pyrimidyl, or pyrazyl, and is more preferably pyridyl.

As described above, the alkyl, aralkyl, aryl, or heterocyclic group may have one or more substituents. The substituents are not particularly limited, and examples include halogen, amino, aminoalkyl, alkoxycarbonyl, acyl, acyloxy, amide, carboxyl, carboxyalkyl, formyl, nitrile, nitro, alkyl, hydroxyalkyl, hydroxyl, alkoxy, aryl, aryloxy, heterocyclic, thiol, alkylthio, arylthio, and like groups. The number of substituents is preferably 1 to 5, and more preferably 1 to 3.

These alkyl, alkylthio, aralkyl, aryl, arylthio, heterocyclic, and amino groups may have one or more substituents. The substituents are not particularly limited, and examples include halogen, amino, aminoalkyl, alkoxycarbonyl, acyl, acyloxy, amide, carboxyl, carboxyalkyl, formyl, nitrile, nitro, alkyl, hydroxyalkyl, hydroxyl, alkoxy, aryl, aryloxy, heterocyclic, thiol, alkylthio, arylthio, and like groups. The number of substituents is preferably 1 to 5, and more preferably 1 to 3.

In the present specification, the "amino group" includes not only amino groups represented by —NH$_2$, but also substituted amino groups, examples of which include C$_{1-6}$ linear or branched monoalkyl amino groups, such as methylamino, ethylamino, n-propylamino, isopropylamino, n-butylamino, isobutylamino, s-butylamino, t-butylamino, 1-ethylpropylamino, n-pentylamino, neopentylamino, n-hexylamino, isohexylamino, and 3-methylpentylamino groups; and dialkyl amino groups having two C$_{1-6}$ linear or branched alkyl groups, such as dimethylamino, ethylmethylamino, and diethylamino groups.

The R groups in the structural formulas of the compound represented by formula (1) and the compound represented by formula (5) are preferably R$^1$, wherein R$^1$ is a hydrazide group, an N'-alkylidene hydrazide group, a thiocarboxyl group, an N-allyl carbamoyl group, a 3-carboxyl acryloyl group, or a hydrazine carboxyamino group. Of these, a hydrazide group is more preferably used.

The R groups in the structural formulas of the compound represented by formula (3), the compound represented by formula (4), and the compound represented by formula (6) are preferably R$^2$, wherein R$^2$ is a hydrazide group, an N'-alkylidene hydrazide group, a thiol group, an N-allyl carbamoyl group, a 3-carboxyl acryloyl group, or a hydrazine carboxyamino group.

The R groups in the structural formulas of the compound represented by formula (3) and the compound represented by formula (4) are more preferably hydrazide groups among the above examples. Further, the R group in the structural formula of the compound represented by formula (6) is more preferably a thiol group.

R$^5$ in the structural formula of the compound represented by formula (3) is more preferably a hydroxy group. In the structural formula of the compound represented by formula (4), R$^6$ is more preferably a methylene group, and R$^7$ is more preferably a methyl group. Further, R$^8$ in the structural formula of the compound represented by formula (6) is more preferably an amino group represented by —NH$_2$.

The R group in the structural formula of the compound represented by formula (2) is preferably R$^3$, wherein R$^3$ is a hydrogen atom, a hydrazide group, an N'-alkylidene hydrazide group, a thiol group, an N-allyl carbamoyl group, a 3-carboxyl acryloyl group, or a hydrazine carboxyamino group. Of these, the R group in the structural formula of the compound represented by formula (2) is more preferably a hydrogen atom.

R$^4$ in the structural formula of the compound represented by formula (2) is more preferably an oxygen atom.

R$^9$ in the structural formula of the compound represented by formula (7) is a heteroatom. The heteroatom is preferably an oxygen atom, a sulfur atom, or NR$^{11}$, wherein R$^{11}$ is a hydrogen atom or an amino group, and particularly preferably —NNH$_2$.

R$^{10}$ in the structural formula of the compound represented by formula (7) is a heterocyclic group. The heterocyclic group is preferably a nitrogen-containing heterocyclic group, more preferably a nitrogen-containing six-membered ring group, and even more preferably a pyridyl group. The pyridyl group may be any of 2-pyridyl, 3-pyridyl, and 4-pyridyl groups, and may further have a substituent. Of these, R$^{10}$ is particularly preferably an unsubstituted 2-pyridyl group, an unsubstituted 3-pyridyl group, or an unsubstituted 4-pyridyl group, and most preferably an unsubstituted 2-pyridyl group.

As the compounds represented by formulas (1), (2), (3), (4), (5), (6), and (7), it is particularly preferable to use compounds represented by the following formulas (1-A), (2-A), (3-A), (4-A), (5-A), (6-A), and (7-A), respectively.

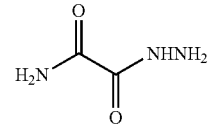

(1-A)

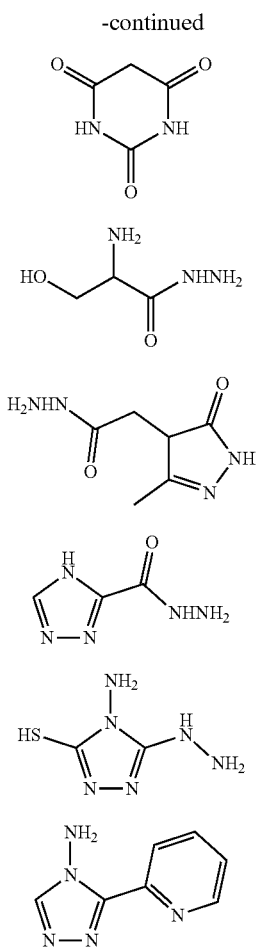

In the present invention, it is also preferable to use 3-methyl-5-pyrazolone, in addition to the compound represented by formula (1), (2), (3), (4), (5), (6), or (7).

In the present invention, among the compounds represented by formulas (1) to (7) and 3-methyl-5-pyrazolone, the compound represented by formula (1) or (3) is particularly preferred.

1.2. Rubber Component

In the present specification, the rubber component is not particularly limited. Examples include diene rubbers, such as natural rubbers (NR), synthetic diene rubbers, and a mixture of natural rubber and synthetic diene rubber; and non-diene rubbers other than these rubbers.

Examples of natural rubbers include natural rubber latex, technically specified rubber (TSR), ribbed smoked sheet (RSS), gutta-percha, Chinese gutta-percha (*Eucommia ulmoides*)-derived natural rubber, guayule-derived natural rubber, Russian dandelion (*Taraxacum kok-saghyz*)-derived natural rubber, and the like. Examples of natural rubbers further include modified natural rubbers, such as epoxidized natural rubber, methacrylic acid modified natural rubber, and styrene modified natural rubber.

Examples of synthetic diene rubbers include styrene-butadiene copolymer rubber (SBR), butadiene rubber (BR), isoprene rubber (IR), nitrile rubber (NBR), chloroprene rubber (CR), ethylene-propylene-diene terpolymer rubber (EPDM), styrene-isoprene-styrene triblock copolymer (SIS), styrene-butadiene-styrene triblock copolymer (SBS), and the like; and modified synthetic diene rubbers thereof.

Examples of modified synthetic diene rubbers include main-chain-modified, one-terminal-modified, both-terminals-modified, or like modified diene rubbers. Examples of functional groups of modified synthetic diene rubbers include groups comprising one or more heteroatom-containing functional groups, such as epoxy, amino, alkoxy, and hydroxyl groups. The cis/trans/vinyl ratio of the diene moiety is not particularly limited, and any ratio is suitable. The average molecular weight and molecular weight distribution of the diene rubber are not particularly limited. The diene rubber preferably has an average molecular weight of 500 to 3,000,000. The method for producing a synthetic diene rubber is also not particularly limited. Examples of the production method include emulsion polymerization, solution polymerization, radical polymerization, anionic polymerization, cationic polymerization, and the like.

A wide variety of non-diene rubbers can be used as the non-diene rubber.

The rubber component preferably contains a diene rubber. The diene rubber is preferably present in an amount of 50 parts by mass or more, more preferably 75 parts by mass or more, and even more preferably 80 to 100 parts by mass, per 100 parts by mass of the rubber component.

Diene rubbers having a glass transition point of −70 to −20° C. are effective in terms of achieving both wear resistance and braking characteristics. In the rubber composition of the present invention, 50 mass % or more of the diene rubber preferably has a glass transition point of −70 to −20° C.

The rubber component can be used singly, or as a mixture (blend) of two or more. Among these, the rubber component is preferably natural rubber, IR, SBR, BR, or a mixture of two or more of these rubbers. More preferably, the rubber component is natural rubber, SBR, BR, or a mixture of two or more of these rubbers. Although the blending ratio of these rubbers is not particularly limited, SBR, BR, or a mixture thereof is preferably present in an amount of 50 to 100 parts by mass, and still more preferably 75 to 100 parts by mass, per 100 parts by mass of the rubber component. When a mixture of SBR and BR is incorporated, the total amount of SBR and BR is preferably within the range mentioned above. In this case, the amount of SBR is preferably in the range of 50 to 100 parts by mass, and the amount of BR is preferably in the range of 0 to 50 parts by mass.

Regarding the mixing ratio of the compounds represented by formulas (1) to (7) and 3-methyl-5-pyrazolone relative to the rubber component, the total amount of the compounds represented by formulas (1) to (7) and 3-methyl-5-pyrazolone is preferably 0.1 to 50 parts by mass, and more preferably 0.2 to 10 parts by mass, per 100 parts by mass of the rubber component. Mixing them at this ratio effectively improves tear strength.

The rubber composition of the present invention comprises a rubber component and at least one member selected from the group consisting of the compounds represented by formulas (1) to (7) and 3-methyl-5-pyrazolone, whereby the rubber component and the compound bind together to form a crosslinked product (gel). The crosslinked product is considered to be composed of strong bonds, such as covalent bonds between the R groups in the compounds represented by formulas (1) to (6), the nitrogen-containing five-membered ring group including $R^9$ in the compound represented by formula (7), the methylene group at position 4 of 3-methyl-5-pyrazolone, and the rubber component; and relatively weak bonds, such as hydrogen bonds between moieties other than the R groups in the compounds represented by formulas (1) to (6), between moieties other than the methylene group at position 4 of 3-methyl-5-pyrazolone, and between $R^9$, $R^{10}$, and the nitrogen atoms in the compound represented by formula (7), and hydrogen bonds with the rubber component and ingredients such as zinc oxide (ZnO). In the present specification, such a crosslinked product is referred to as a "soft gel." The soft gel is formed in the rubber composition to thereby increase the number of crosslinking points compared with a crosslinked product with covalent crosslinking alone (in the present specification, such a crosslinked product is referred to as a "hard gel"), so that mechanical properties such as rupture strength are improved.

1.3. Other Components

In addition to the compounds and rubber component described above, the rubber composition of the present invention may also contain fillers, ingredients typically used in the rubber industry, such as antioxidants, ozone inhibitors, softeners, processing aids, waxes, resins, foaming agents, oils, stearic acid, zinc oxide (ZnO), vulcanization accelerators, vulcanization retarders, and vulcanizing agents (sulfur), which can be appropriately selected and mixed within a range that does not impair the object of the present invention.

As the filler, a known filler used in the rubber industry can be widely used. Specific examples include, but are not limited to, carbon black and inorganic fillers.

The carbon black is not particularly limited. For example, commercially available carbon blacks, carbon-silica dual phase fillers, and the like can be used.

Specific examples of carbon blacks include high-, middle- or low-structure SAF, ISAF, IISAF, N110, N134, N220, N234, N330, N339, N375, N550, RAF, FEF, GPF, or SRF-grade carbon black, and the like. Among these, SAF, ISAF, IISAF, N134, N234, N330, N339, N375, HAF, or FEF-grade carbon black is preferable.

There is no particular limitation on the DBP absorption of the carbon black. The carbon black preferably has a DBP absorption of 60 to 200 $cm^3/100$ g, more preferably 70 to 180 $cm^3/100$ g, and particularly preferably 80 to 160 $cm^3/100$ g.

The carbon black preferably has a nitrogen adsorption specific surface area (N2SA, measured according to JIS K6217-2: 2001) of 30 to 200 $m^2/g$, more preferably 40 to 180 $m^2/g$, and particularly preferably 50 to 160 $m^2/g$.

The inorganic filler is not particularly limited as long as it is an inorganic compound usually used in the rubber industry. Examples of usable inorganic compounds include silica; aluminas ($Al_2O_3$) such as γ-alumina and α-alumina; alumina monohydrates ($Al_2O_3 \cdot H_2O$) such as boehmite and diaspore; aluminum hydroxides $[Al(OH)_3]$ such as gibbsite and bayerite; aluminum carbonate $[Al_2(CO_3)_3]$, magnesium hydroxide $[Mg(OH)_2]$, magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide $[Ca(OH)_2]$, magnesium aluminum oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicates ($Al_2SiO_5$, $Al_4 \cdot 3SiO_4 \cdot 5H_2O$, etc.), magnesium silicates ($Mg_2SiO_4$, $MgSiO_3$, etc.), calcium silicates ($Ca_2 \cdot SiO_4$, etc.), aluminum calcium silicates ($Al_2O_3 \cdot CaO \cdot 2SiO_2$, etc.), magnesium calcium silicate ($CaMgSiO_4$), calcium carbonate ($CaCO_3$), zirconium oxide ($ZrO_2$), zirconium hydroxide $[ZrO(OH)_2 \cdot nH_2O]$, zirconium carbonate $[Zr(CO_3)_2]$, and crystalline aluminosilicates containing hydrogen, alkali metal, or alkaline earth metal that compensate charge, such as various types of zeolites. To enhance affinity to the rubber component, the surface of these inorganic fillers may be treated with an organic compound.

Among these, the inorganic filler is preferably silica from the viewpoint of braking characteristics. The BET specific surface area of silica is not particularly limited and may be, for example, in the range of 40 to 350 $m^2/g$. Silica that has a BET specific surface area within this range is advantageous in that rubber reinforcement and dispersibility in the rubber component can both be achieved. The BET specific surface area is measured according to ISO 5794/1.

From this viewpoint, preferred is silica having a BET specific surface area of 50 to 250 $n^2/g$, more preferred is silica having a BET specific surface area of 100 to 270 $m^2/g$, and particularly preferred is silica having a BET specific surface area of 110 to 270 $m^2/g$.

Examples of commercially available products of such silica include products under the trade names of: HD165MP (BET specific surface area: 165 $m^2/g$), HD115MP (BET specific surface area: 115 $m^2/g$), HD200MP (BET specific surface area: 200 $m^2/g$), and HD250MP (BET specific surface area: 250 $m^2/g$), all produced by Quechen Silicon Chemical Co., Ltd.; Nipsil AQ (BET specific surface area: 205 $m^2/g$) and Nipsil KQ (BET specific surface area: 240 $m^2/g$), both produced by Tosoh Silica Corporation; Ultrasil VN3 (BET specific surface area: 175 $m^2/g$) produced by Degussa AG; and the like.

The amount of filler is usually 20 to 120 parts by mass, preferably 30 to 100 parts by mass, and more preferably 40 to 90 parts by mass, per 100 parts by mass of the rubber component.

2. Tire

The rubber composition of the present invention described above can be used to produce a tire, whereby the resulting tire can have excellent mechanical characteristics, particularly tear strength.

In the tire of the present invention, the above rubber composition is used particularly for at least one member selected from tread, sidewall, bead area, belt, carcass, and shoulder portions.

Among these, according to one of the most preferable embodiments, a tire tread portion of a pneumatic tire is formed using the rubber composition.

The "tread" is a portion that has a tread pattern and comes into direct contact with the road surface. The tread refers to a tire casing portion for protecting the carcass and preventing wear and flaws, and refers to a cap tread that constitutes the grounding part of a tire and/or to a base tread that is disposed inside the cap tread.

The "sidewall" refers to, for example, a portion from the lower side of a shoulder portion to a bead portion of a pneumatic radial-ply tire. Sidewall portions protect the carcass and are bent the most when the vehicle drives.

The "bead area" portions function to anchor both ends of carcass cords and simultaneously hold the tire to the rim.

Beads are composed of bundles of high carbon steel.

The "belt" refers to a reinforcing band disposed between the carcass and the tread of a radial structure in the circumferential direction. The belt tightens the carcass like a hoop of a barrel to enhance the rigidity of the tread.

The "carcass" refers to a cord layer portion that forms the framework of the tire. The carcass plays a role in bearing the load, impact, and filled air pressure applied to the tire.

The "shoulder" refers to a shoulder portion of the tire. Shoulder portions play a role in protecting the carcass.

The tire of the present invention can be produced by methods known in the field of tires. The tire may be filled with ordinary air, or air having an adjusted oxygen partial pressure; or an inert gas, such as nitrogen, argon, or helium.

3. Additive for Rubber

When used as additives for rubber, the compounds represented by formulas (1) to (7) and 3-methyl-5-pyrazolone can impart high tear strength to rubber materials to be formed. Such an additive for rubber may be at least one compound itself selected from the group consisting of the compounds represented by formulas (1) to (7) and 3-methyl-5-pyrazolone; that is, the additive for rubber may consist of at least one member selected from the group consisting of the compounds represented by formulas (1) to (7) and 3-methyl-5-pyrazolone, or may contain other components within a range that does not interfere with the effect. As other components, for example, known oils, resins, stearic acid, zinc oxide (ZnO), calcium carbonate, and silica can be widely used.

4. Tear Strength-Imparting Agent

As stated above, the additive for rubber of the present invention can impart excellent tear strength to rubber materials, and can be suitably used as a tear strength-imparting agent.

5. Method for Producing Rubber Composition

The method for producing the rubber composition of the present invention is not particularly limited. For example, the rubber composition can be obtained by mixing the rubber component mentioned above, at least one member selected from the group consisting of the compounds represented by formulas (1) to (7) and 3-methyl-5-pyrazolone, and optionally other components. Further, the rubber component, the compounds represented by formulas (1) to (7), and 3-methyl-5-pyrazolone may also be produced by known methods.

The mixing method mentioned above is not particularly limited, and a wide range of known methods can be used. Specifically, for example, the rubber component, at least one member selected from the group consisting of the compounds represented by formulas (1) to (7) and 3-methyl-5-pyrazolone, and optionally other components are kneaded using a kneader or the like.

Embodiments of the present invention are described above; however, the present invention is not limited to these examples. Needless to say, the present invention can be carried out in various forms without departing from the gist of the present invention.

EXAMPLES

Embodiments of the present invention are described in more detail below based on Examples; however, the present invention is not limited to these.

Production Example 1: Production of 2-Hydrazinyl-2-Oxoacetamide (Compound 1-A)

5.91 g of ethyl oxamate and 4.29 g of 100% hydrazine monohydrate were added to 50 mL of methanol, and the mixture was stirred at 65° C. for 15 hours. The reaction liquid was cooled and then filtered, and the obtained solid was washed with methanol. The obtained solid was dried under reduced pressure, thereby obtaining 4.68 g (yield: 90%) of the target product.

1H-NMR (400 MHz, DMSO-d6, δppm):
4.5 (br-s, 2H), 7.7 (br-s, 1H), 8.0 (br-s, 1H), 9.9 (br-s, 1H)
Melting Point: 213° C.

Production Example 2: Production of 2-Amino-3-Hydroxypropanehydrazide (Compound 3-A)

50.0 mL of a methanol solution of 7.81 g of DL-serine methyl ester hydrochloride was cooled to 0° C., and 6.20 g of triethylamine and 2.86 g of 100% hydrazine monohydrate were added in sequence. After the reaction liquid was stirred at 65° C. for 16 hours, the solvent was distilled off. 50.0 mL of tetrahydrofuran was added to the residue, the reaction liquid was filtered, and the obtained solid was washed with methanol. The obtained solid was dried under reduced pressure, thereby obtaining 3.84 g (yield: 643) of the target product.

1H-NMR (500 MHz, DMSO-d6, δppm):
3.7 (m, 3H), 4.4 (br-s, 2H), 5.5 (br-s, 1H), 8.2 (br-s, 2H), 9.6 (br-s, 1H)
Melting Point: 183° C.

Production Example 3: Production of 2-(3-Methyl-5-Oxo-4,5-Dihydro-1H-Pyrazol-4-Yl) Acetohydrazide (Compound 4-A)

14.0 g of dimethyl acetyl succinate and 7.82 g of 100%-hydrazine monohydrate were added to 40 mL of methanol, and the mixture was stirred at 65° C. for 4 hours. The reaction liquid was cooled and then filtered, and the obtained solid was washed with methanol. The obtained solid was dried under reduced pressure, thereby obtaining 10.7 g (yield: 84%) of the target product.

1H-NMR (500 MHz, DMSO-d6, δppm):
2.1 (s, 3H), 3.0 (s, 2H), 3.3 (br-s, 1H), 9.0 (br-s, 1H), NH (1H), NH2 (2H) undetectable
Melting Point: 183° C.

Production Example 4: Production of 4H-1,2,4-Triazole-3-Carbohydrazide (Compound 5-A)

12.5 g of 1,2,4-triazole-3-methyl carboxylate and 9.85 g of 1003 hydrazine monohydrate were added to 100 mL of methanol, and the mixture was stirred at 65° C. for 15 hours. The reaction liquid was cooled and then filtered, and the obtained solid was washed with methanol. The obtained solid was dried under reduced pressure, thereby obtaining 12.3 g (yield: 98%) of the target product.

1H-NMR (500 MHz, DMSO-d6, δppm):
4.5 (br-s, 2H), 8.4 (br-s, 1H), 9.8 (br-s, 1H), 14.5 (br-s, 1H)
Melting point: 208° C.

Production Example 5: Production of 2-(Pyridin-2-Yl)-1,3,4-Oxadiazole (Compound 7-B)

16.5 g of 2-pyridinecarboxylic acid hydrazide and 2.4 g of tosylate monohydrate were added to 66.0 mL of triethyl orthoformate, and the mixture was stirred at 145° C. for 6 hours. The reaction liquid was cooled to room temperature, poured into an aqueous sodium hydrogen carbonate solution, and extracted with ethyl acetate. After the solvent was distilled off, the precipitated solid was recrystallized from hexane and ethyl acetate. The obtained solid was dried under reduced pressure, thereby obtaining 7.81 g (yield: 44%) of the target product.

$^1$H-NMR (400 MHz, DMSO-d6, δppm):

7.7 (m, 1H), 8.1 (m, 1H), 8.2 (m, 1H), 8.8 (m, 1H), 9.4 (s, 1H)

Melting Point: 119° C.

Production Example 6: Production of 3-(Pyridin-2-Yl)-4H-1,2,4-Triazol-4-Anine (Compound 7-A)

4.41 g of 2-(pyridin-2-yl)-1,3,4-oxadiazole (compound 7-B) and 6.31 g of 100% hydrazine monohydrate were added to 28 mL of butanol, and the mixture was stirred at 117° C. for 20 hours, after which the solvent was distilled off. 25 mL of diethyl ether and 25 mL of isopropyl alcohol were added to the residue, the reaction liquid was filtered, and the obtained solid was washed. The obtained solid was dried under reduced pressure, thereby obtaining 3.00 g (yield: 62%) of the target product.

$^1$H-NMR (400 MHz, DMSO-d6, δppm):

4.6 (br-s, 2H), 7.6 (m, 1H), 8.0 (m, 1H), 8.6 (m, 1H), 9.9 (br-s, 1H)

Melting Point: 101° C.

Examples 1 to 9 and Comparative Examples 1 to 4: Production of Rubber Compositions The components shown in step (I) of Table 1 below were mixed at the ratio (parts by mass) shown in the table, and kneaded with a Banbury mixer. After the mixture was cured until its temperature reached 80° C. or lower, the components shown in step (II) of Table 1 were added at the ratio (parts by mass) shown in the table, and kneaded while adjusting the maximum temperature of the mixture to 110° C. or lower, thereby producing a rubber composition. The rubber composition obtained here was heated at 150° C. for 30 minutes using a vulcanization press to obtain each rubber.

Tear Strength Evaluation Test

The tear strength index of the rubber compositions obtained in Examples 1 to 9 and Comparative Examples 1 to 4 was measured according to JIS K6252 using a crescent test piece at room temperature and a tensile speed of 500 mm/min. The evaluation results of the Examples and Comparative Examples were expressed by an index with the value of a rubber composition prepared using the same formulation content and the same production method as those of the Examples except that no compound was added (Comparative Example 1), which was taken as 100, and the tear strength was calculated based on the following formula. A higher value of tear strength indicates superior tear strength.

tear strength index=(tear strength of each of the rubber compositions of Examples 1 to 9)×100/(tear strength of Comparative Example 1)

tear strength index=(tear strength of each of the rubber compositions of Comparative Examples 2 to 4)×100/(tear strength of Comparative Example 1)

TABLE 1

| | | | Comp Ex 1 | Ex 1 | Ex 2 | Ex 3 | Ex 4 | Ex 5 | Ex 6 | Ex 7 | Ex 8 | Ex 9 | Comp Ex 2 | Comp Ex 3 | Comp Ex 4 |
|---|---|---|---|---|---|---|---|---|---|---|---|---|---|---|---|
| Formulation content (phr) | Step I | Natural rubber*[1] | 100 | 100 | 100 | 100 | 100 | 100 | 100 | 100 | 100 | 100 | 100 | 100 | 100 |
| | | Chemical 1*[2] | | 1 | | | | | | | | | | | |
| | | Chemical 2*[3] | | | 1 | | | | | | | | | | |
| | | Chemical 3*[4] | | | | 1 | | | | | | | | | |
| | | Chemical 4*[5] | | | | | 1 | | | | | | | | |
| | | Chemical 5*[6] | | | | | | 1 | | | | | | | |
| | | Chemical 6*[7] | | | | | | | 1 | | | | | | |
| | | Chemical 7*[8] | | | | | | | | 1 | | | | | |
| | | Chemical 8*[9] | | | | | | | | | 1 | | | | |
| | | Chemical 9*[10] | | | | | | | | | | 1 | | | |
| | | Chemical 10*[11] | | | | | | | | | | | 1 | | |
| | | Chemical 11*[12] | | | | | | | | | | | | 1 | |
| | | Chemical 12*[13] | | | | | | | | | | | | | 1 |
| | | Carbon black 1*[14] | 50 | 50 | 50 | 50 | 50 | 50 | 50 | 50 | 50 | 50 | 50 | 50 | 50 |
| | | Antioxidant*[15] | 2 | 2 | 2 | 2 | 2 | 2 | 2 | 2 | 2 | 2 | 2 | 2 | 2 |
| | | Wax*[16] | 2 | 2 | 2 | 2 | 2 | 2 | 2 | 2 | 2 | 2 | 2 | 2 | 2 |
| | | Zinc oxide*[17] | 3 | 3 | 3 | 3 | 3 | 3 | 3 | 3 | 3 | 3 | 3 | 3 | 3 |
| | | Stearic acid*[18] | 2 | 2 | 2 | 2 | 2 | 2 | 2 | 2 | 2 | 2 | 2 | 2 | 2 |
| | Step II | Vulcanization accelerator*[19] | 1.2 | 1.2 | 1.2 | 1.2 | 1.2 | 1.2 | 1.2 | 1.2 | 1.2 | 1.2 | 1.2 | 1.2 | 1.2 |
| | | Sulfur*[20] | 2 | 2 | 2 | 2 | 2 | 2 | 2 | 2 | 2 | 2 | 2 | 2 | 2 |
| Tear strength (index) | | | 100 | 150 | 130 | 151 | 205 | 139 | 140 | 193 | 152 | 191 | 103 | 104 | 93 |

*[1]natural rubber; TSR-20, produced by Guangken Rubber
*[2]compound 1-A; 2-hydrazinyl-2-oxoacetamide produced in Production Example 1
*[3]compound 2-A; barbituric acid, produced by Tokyo Chemical Industry Co., Ltd.
*[4]compound 3-A; 2-amino-3-hydroxypropanehydrazide produced in Production Example 2
*[5]compound 4-A; 2-(3-methyl-5-oxo-4,5-dihydro-1H-pyrazol-4-yl)acetohydrazide produced in Production Example 3
*[6]compound 5-A; 4H-1,2,4-triazole-3-carbohydrazide produced in Production Example 4
*[7]compound 6-A; 4-amino-3-hydrazino-5-mercapto-1,2,4-triazole, produced by Tokyo Chemical Industry Co., Ltd.
*[8]compound 7-A; (3-(pyridin-2-yl)-4H-1,2,4-triazol-4-amine) produced in Production Example 6
*[9]compound 7-B; (2-(pyridin-2-yl)-1,3,4-oxadiazole) produced in Production Example 5
*[10]3-methyl-5-pyrazolone, produced by Otsuka Chemical Co., Ltd.
*[11]benzoic acid hydrazide, produced by Tokyo Chemical Industry Co., Ltd.
*[12]oxamide, produced by Tokyo Chemical Industry Co., Ltd.
*[13]1,2,4-triazole-3-carboxamide, produced by Tokyo Chemical Industry Co., Ltd.
*[14]carbon black; N234, produced by Cabot
*[15]antioxidant (N-phenyl-N'-(1,3-dimethylbutyl)-p-phenylenediamine); produced by Kemai Chemical Co., Ltd.
*[16]wax; Antilux 111, produced by Rhein Chemie Rheinau TABLE 1-continued

| | Comp Ex 1 | Ex 1 | Ex 2 | Ex 3 | Ex 4 | Ex 5 | Ex 6 | Ex 7 | Ex 8 | Ex 9 | Comp Ex 2 | Comp Ex 3 | Comp Ex 4 |
|---|---|---|---|---|---|---|---|---|---|---|---|---|---|

[17]zinc oxide; produced by Dalian Zinc Oxide Co., Ltd.
[18]stearic acid; produced by Sichuan Tianyu Grease
[19]vulcanization accelerator; N-(tert-butyl)-2-benzothiazole sulfenamide; Sunseller NS-G, produced by Sanshin Chemical Industry Co., Ltd.
[20]sulfur; produced by Shanghai Jinghai Chemical Co., Ltd.

It was confirmed that superior tear strength could be achieved when the rubber composition of each Example was used, as compared with when the rubber composition of each Comparative Example was used.

INDUSTRIAL APPLICABILITY

The use of the rubber composition of the present invention makes it possible to obtain rubber materials having high tear strength. The rubber composition of the present invention can be suitably used for tires etc. Further, the additive for rubber of the present invention can impart high tear strength to rubber materials.

The invention claimed is:

1. A rubber composition comprising at least one compound selected from the group consisting of 2-amino-3-hydroxypropanehydrazide, 2-(3-methyl-5-oxo-4,5-dihydro-1H-pyrazol-4-yl)acetohydrazide, 4H-1,2,4-triazole-3-carbohydrazide, 3-(pyridin-2-yl)-4H-1,2,4-triazol-4-amine and 2-(pyridin-2-yl)-1,3,4-oxadiazole.

2. A tire using the rubber composition according to claim 1.

* * * * *